Patented Aug. 10, 1937

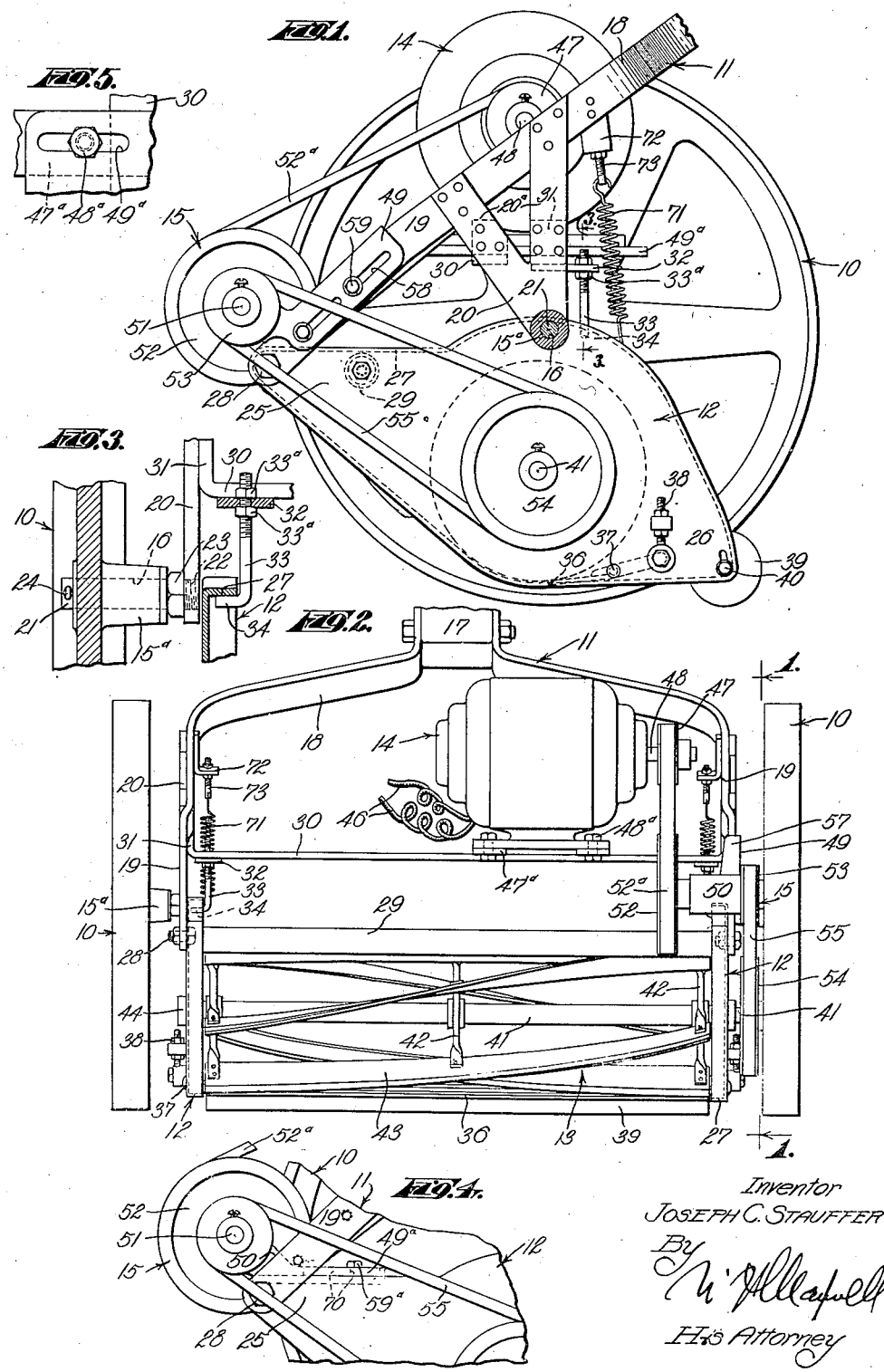

2,089,445

UNITED STATES PATENT OFFICE 2,089,445

LAWN MOWER

Joseph C. Stauffer, Los Angeles, Calif.

Application December 28, 1936, Serial No. 117,853

15 Claims. (Cl. 56—26)

This invention relates to lawn mowers and relates more particularly to power operated lawn mowers. A general object of this invention is to provide a practical, simple and inexpensive lawn mower having an electrically driven cutter.

Power operated or power driven lawn movers of various characters have been proposed and introduced. In most instances lawn mowers of this character have been heavy and cumbersome and, therefore, difficult to operate and have been expensive to manufacture.

Another object of this invention is to provide a lawn mower embodying an electrically driven cutter that is small and compact, light in weight and inexpensive to manufacture.

Another object of this invention is to provide a lawn mower of the character mentioned in which the motor for driving the cutter is mounted directly over the cutter to be carried by the main wheels of the mower as distinguished from prior power driven mowers in which the motors were carried by wheels leading or trailing the main wheels.

Another object of this invention is to provide a power operated lawn mower that requires only two wheels for carrying the various elements and mechanisms of the mower.

Another object of this invention is to provide a lawn mower of the character mentioned that embodies an extremely simple and yet effective mounting for the motor.

Another object of this invention is to provide a lawn mower of the character mentioned in which the motor, the pulleys, etc., of the cutter drive, the side plates and the cutter, are all carried by the yoke of the handle which, in turn, is pivotally carried by the axles of the main wheels, thereby producing an extremely simple and compact arrangement of parts.

A further object of this invention is to provide a lawn mower of the character mentioned in which little or no weight is imposed on the operator through the handle.

The various objects and features of my invention will be fully understood from the following detailed description of typical preferred forms and applications of my invention, throughout which description reference is made to the accompanying drawing, in which:

Fig. 1 is an enlarged vertical detailed sectional view of the mower provided by this invention, being a view taken as indicated by line 1—1 on Fig. 2. Fig. 2 is a front elevation of the mower with the handle broken away. Fig. 3 is an enlarged fragmentary vertical detailed sectional view taken as indicated by line 3—3 on Fig. 1. Fig. 4 is a fragmentary side elevation of a portion of the mower illustrating an alternative mounting for the pulley shaft, and Fig. 5 is an enlarged fragmentary elevation view illustrating a part of the motor mounting.

The improved lawn mower of the invention illustrated in Figs. 1, 2, 3, and 5, includes, generally, two main wheels 10, a handle yoke 11 carried by the axles of the wheels 10, side plates 12 carried by the yoke 11, a rotatable cutter 13 arranged between the plates 12, a motor 14 supported by the yoke 11, and a drive 15 between the motor 14 and the rotary cutter 13.

The wheels 10 are the traction elements and the main supporting elements of the mower. The wheels 10 may be of any suitable design and construction. It is preferred to employ wheels 10 that are relatively large in diameter, as illustrated. The particular wheels 10 illustrated in the drawing have inwardly projecting hubs 15$^a$ provided with central openings 16.

The handle yoke 11 carries a suitable handle 17, and in accordance with the invention the yoke 11 serves to mount or support the various elements of the mower on the axles of the wheels 10. The yoke 11 comprises two like oppositely arranged tine members 18 whose upper ends are secured to the lower end of the handle 17. The yoke members 18 extend outwardly and downwardly in opposite directions from the handle 17 and have lower portions 19 that are substantially parallel with one another. The lower portions 19 of the yoke members 18 are in spaced parallel relation to the inner sides of the wheels 10. The portions 19 preferably project downwardly and forwardly at increasing or sharper angles, as illustrated in Fig. 1. Brackets 20 depend from the portions 19 of the yoke members 18. In the particular structure illustrated, the brackets 20 comprise spaced arms 20$^a$ whose upper ends are rigidly secured to the portions 19. The bracket arms 20$^a$ converge downwardly and their lower ends are integrally joined. Trunnions or axles 21 for the wheels 10 project outwardly from the lower portions of the brackets 20. In practice the axles 21 may be threaded in openings 22 in the brackets 20 and may be locked against rotation and displacement by lock nuts 23. The axles 21 extend outwardly through the openings 16 in the wheel hubs 15$^a$ to rotatably carry the wheels 10. Keys 24 or other suitable means may be provided on the outer ends of the axles 21 to prevent the displacement of the wheels 10 from the axles. It will be observed that the structure mounting the yoke 11 on the wheels 10 is very simple and inexpensive.

The side plates 12 are provided at the inner sides of the wheels 10 and, in accordance with the invention, are suspended from or carried by the yoke 11. The plates 12 may be castings or may be stamped metal parts. The two plates 12 are alike but are arranged in opposing relation. The plates 12 may be varied considerably in shape and may be formed as found most desirable. The intermediate portions of the plates 12 are of substantial width and height and have rounded upper and lower edges. The plates may have forwardly and upwardly projecting end parts 25 provided with forwardly convergent upper and lower edges. The upper edges of the parts 25 may be substantially horizontal as illustrated. The plates 12 may also have rearwardly projecting parts 26 having rearwardly and downwardly convergent edges. The side plates 12 preferably have marginal flanges 27. The flanges 27 project from the inner sides of the plates 12 and may extend throughout the edges of the plates.

In accordance with the invention, the plates 12 are pivotally connected with the lower ends or parts of the yoke members 18. The end parts 25 of the plates 12 project forwardly to the lower ends of the yoke portions 19 and are pivotally connected therewith. In the particular case illustrated pivot pins or bolts 28 pass through suitable openings in the end parts 25 of the plates and the lower portions 19 of the yoke members 18 to pivotally support the plates on the yoke members. A suitable spacer 29 may be provided to engage against the inner sides of the plate parts 25 to assist in holding the plates 12 in parallelism. From the above it will be seen that the two side plates 12 are pivotally connected with the lower ends of the yoke members 18 and have pivotal movement about a substantially horizontal axis.

The invention provides novel suspension means for slackly connecting or suspending the rear portions of the plates 12 from the handle yoke 11. Two spaced horizontal support members 30 extend between the spaced brackets 20. The supporting members 30 may have upturned flanges 31 on their ends rigidly secured to the inner sides of the bracket arms 20ª. Substantially horizontal arms 32 project rearwardly from the members 30 adjacent the brackets 20. Hook-like rods 33 are passed through vertical openings in the arms 32 and have fingers 34 on their lower ends projecting outwardly to engage under the flanges 27 on the upper edges of the plates 12. Nuts 33ª are threaded on the rods 33 to clamp against the upper and lower sides of the arms 32 to secure the rods 33 to the arms. The nuts 33ª may be threaded along the rods 33 to adjust the rods vertically and, therefore, vary or regulate the normal positions of the plates. The hook parts or fingers 34 of the rods 33 engage under the flanges 27 in planes adjacent but slightly rearward of the common axis of the wheels 10. It will be apparent how the fingers 34 cooperate with the flanges 27 to limit downward pivoting of the plates 12 relative to the yoke 11 and to assist in supporting or suspending the plates from the yoke. It will be observed that the fingers 34 engaging under the flanges 27 allow the plates 12 to swing or pivot upwardly, on the pivot pins 28, with respect to the yoke 11. It is to be particularly noted that the plates 12 carried by the pins 28 and the rods 33, as just described, are entirely supported by the yoke 11 which, in turn, is carried by the axles 21 of the wheels 10.

The plates 12 carry a relatively stationary cutter blade 36. The blade 36 extends horizontally between the two plates 12 and is tilted or sloped to be in the proper relation to the rotatable cutter 13. The blade 36 is pivotally or tiltably connected with the plates 12 at 37 and suitable adjusting means 38 are provided to regulate the set or pitch of the blade. If desired or believed necessary the rear parts 26 of the plates 13 may carry a suitable roller 39. It is to be understood that the roller 39 is not essential and may be omitted if desired. The particular roller 39 illustrated has suitable rotatable mountings 40 on the rear end parts 26 of the plates 12 so that it may roll along the lawn in trailing relation to the cutter 13.

The invention may include means for counter-balancing or partially counter-balancing the weight of the plates 12 and the parts carried thereby so that the plates may more easily lift or raise when the roller 39 passes over stones or irregularities in the lawn. This means may comprise coiled springs 71 connected between the plates 12 and the yoke members 18. The lower ends of the springs 71 may be secured to the flanges 27 extending along the upper edges of the plates 12. The upper ends of the springs 71 are adjustably connected with the yoke members 18. In the structure illustrated, brackets 72 project inwardly from the inner sides of the above described yoke portions 19 and adjustable screws 73 are carried by the brackets 72 to attach the upper ends of the springs 71 to the yoke members. The springs 71 normally exert an upward pulling force or lifting force on the plates 12 to partially counter-balance the weight of the plates and the parts carried thereby.

The cutter 13 is the rotatable cutting element of the mower and cooperates with the relatively stationary blade 36 to cut the grass. The present invention is not primarily concerned with the details of the rotary cutter and any suitable form of rotary cutter may be employed. The particular rotary cutter illustrated includes a shaft or axle 41, spokes 42 radiating from the axle 41 and helical or spiral blades 43 carried by the spokes 42. The opposite end portions of the cutter axle 41 are rotatably supported by suitable bearings 44 on the plates 12. One end portion of the axle 41 projects from the outside of one of the plates 12. It will be observed that the axis of rotation of the rotary cutter 13 is directly or substantially directly below the axis of rotation of the wheels 10. The cutter 13 is, of course, positioned so that its blades 43 have proper cooperation with the relatively stationary blade 36.

The motor 14 is provided to drive or rotate the cutter 13 through the medium of the drive 15. The motor 14 is a suitable electric motor of the required H. P. and R. P. M. rating. It is, of course, desirable to employ as small and as light a motor as practicable. The positioning or mounting of the motor 14 is important. The motor 14 is supported on the members 30 to be substantially directly above the common axis of the wheels 10. Thus the weight of the motor is not imposed on the handle 17 in a manner to cause tipping of the mower or to impose its weight on the operator of the mower. The motor 14 is preferably located adjacent the side plate 12 from which the cutter axle 41 projects. Further, the motor 14 is positioned with its axis parallel with the axes of the cutter 13 and the wheels 10. The cord or wires 46 for carrying the energizing current to the motor 14 may be suitably trained or directed to extend to a convenient source of electrical energy. The motor 14 is preferably mounted for adjustment in a direction transverse of its axis. In the case illustrated, the motor 14 is mounted on skids or plates 47a on the supporting members 30. Securing bolts 48a pass through slots 49a in the base of the motor and openings in the plates 47a, whereby the motor may be shifted or adjusted in the direction just described.

The drive 15 between the motor 14 and the rotary cutter 13 is preferably in the nature of a belt and pulley drive, although it may be in the form of a chain and socket drive if desired. In the structure illustrated, the drive 15 includes a pulley 47 fixed on the shaft 48 of the motor 14. A bracket 49 is mounted on the adjacent portion 19 of a yoke member 18. A bearing 50 on the bracket 49 carries a rotatable shaft 51. A pulley 52 is fixed to the shaft 51 to be in alignment with the pulley 47 on the motor shaft 48. The pulley 52 is considerably larger in diameter than the pulley 47. A suitable belt 52a operates over the pulleys 47 and 52, whereby the motor 14 drives the shaft 51. A pulley 53 is fixed on the shaft 51 at the outer end of the bearing 50. The pulley 53 is preferably smaller in diameter than the pulley 52. A pulley 54 is fixed on the above-mentioned projecting end part of the cutter shaft 41 to be at the outer side of the adjacent plate 12. The pulley 54 is in alignment with the pulley 53 and is considerably larger than the pulley 53. A suitable belt 55 operates over the pulleys 53 and 54, whereby the shaft 51 driven by the motor 14, drives the shaft 41 of the cutter 13. It is to be understood that the ratio of effective diameters of the several pulleys 47, 52, 53 and 54 may be such that the rotary cutter 13 is driven at the proper speed.

The brackets 49 carrying the bearing 50 is mounted so that the axis of the shaft 51 is adjacent the pivotal axis of the plates 12. Because of this relationship any lifting of the plates 12 due to the operation of the blade 36 or the roller 39 over stones or the like does not disturb the spacing of the pulleys 53 and 54 to any appreciable degree and, therefore, does not cause excessive tautness or slack in the belt 55. In the construction illustrated in Figs. 1 and 2 of the drawing the bracket 49 is secured to the lower portion 19 of the adjacent yoke member 11. The bracket 49 is arranged against the outer side of the said portion 19 and has a flange 57 seating downwardly on the upper edge of the portion 19. Elongated openings or slots 58 are provided in the bracket 49 and screws 59 are threaded in openings in the portion 19 and pass through the slots 58 to adjustably secure the bracket 49 to said portion. By suitably adjusting the bracket 49 the tension of the belt 55 may be varied at will.

Fig. 4 of the drawing illustrates a slightly modified form of the invention. In the structure illustrated in Fig. 4 the bearing 50 for the pulley shaft 51 is carried by a bracket 49a. The bracket 49a is arranged on the flange 27 extending along the upper edge of the part 25 of the adjacent side plate 12. The portion of the flange 27 on which the bracket 49a seats is straight and normally substantially horizontal. In accordance with the invention, the bracket 49a is adjustably secured to the flange 27. Screws 59a are threaded in openings in the flange 27 and pass through slots 70 in the bracket 49a to have their heads engage against the upper side of the bracket. It will be apparent how the bracket 49a may be adjusted to provide for the proper tensioning of the belt 55.

It is believed that the operation of the lawn mower provided by this invention will be readily understood from the foregoing detailed description. Referring to Figs. 1, 2, 3, and 5 it will be seen that the motor 14 is operable to drive or rotate the cutter 13 through the drive 15 comprising the pulleys 47 and 52, carrying the belt 52a and the pulleys 53 and 54 carrying the belt 55. The motor 14 only serves to rotate or drive the cutter 13, and the traction wheels 10 are not driven by the motor. Accordingly, the mower is under the full control of the operator. The motor 14 is supported by the members 30 to be directly over the common axis of the wheels 10 so that its weight is not imposed on the handle 17 and does not tend to cause tipping of the mower. Because of the central location of the motor 14 it is unnecessary to provide leading or trailing wheels or rollers to carry the motor.

The side plates 12 which carry the rotary cutter 13 and the stationary blade 36 are supported by the yoke 11 by simple, dependable means so that they may swing or oscillate when necessary. The rods 33 limit the downward pivoting of the plates 12 and normally suspend the plates where the cutter 13 and the blade 36 are properly positioned to cut the grass. The bolts 28 and the rods 33 secure the plates 12 to the yoke 11 in such a manner that the weight of the plates and the parts connected therewith has its center of gravity located to maintain the mower in a proper state of equilibrium. It will be observed that the cutter 13 and the center of gravity of the plates 12 are substantially directly below the axis of the wheels 10 so that the weight of these parts is not imposed on the operator through the medium of the handle 17. The rods 33 suspend the rear portions of the plates 12 from the yoke 11 so that the operator may swing or pivot the handle 17 to change the positions of the cutter 13 and the associated parts when the mower is operated over inclines, terraces, or the like. Thus the operator has control over the action of the cutter 13. In the event that the mower passes over a stone, or the like, the plates 12 carrying the rotary cutter 13 are free to pivot upwardly about the pivot pins or bolts 28. The springs 71 partially counterbalance the plates 12 and the parts carried thereby and allow the plates and said parts to more readily raise or pivot upwardly. The axis of the pulley shaft 51 is adjacent the pivotal axis of the plates 12 so that pivoting of the plates and the parts carried thereby disturbs the belt 55 to a minimum extent.

It is to be particularly noted that the mounting for the motor 14 and the means supporting the plates 12 and the parts carried thereby are extremely simple, light in weight and inexpensive. The handle yoke 11 serves to support the motor 14 and the plates 12 which in turn carry the rotary cutter 13, the stationary blade 36 and the roller 37. Thus the handle yoke 11 carries the principal parts of the mower. The yoke 11 is, in turn, carried by the axles 21 of the wheels 10 in such a manner that the aggregate weight of the several parts of the mower acts substantially directly downward on the axles. The mower provided by this invention is light and compact and is very easy to operate.

Having described only typical preferred forms and applications of my invention, I do not wish to be limited or restricted to the specific forms and applications herein set forth, but wish to reserve to myself any modifications or variations that may appear to those skilled in the art or fall within the scope of the following claims:

Having described my invention, I claim:

1. A lawn mower including, a pair of supporting wheels, axles for the wheels, a handle yoke pivoted on said axles, end plates carried by the yoke for limited pivotal movement, a rotary cutter between the plates, and a motor supported by the yoke for driving the cutter.

2. A lawn mower including, a pair of supporting wheels, axles for the wheels, a yoke pivotally carried on said axles, a handle on the yoke and extending rearwardly therefrom, side plates, means pivotally connecting the forward parts of the plates with the yoke, means slackly suspending the rear portions of the plates from the yoke, a rotary cutter carried by the plates, a motor carried by the yoke, and a drive between the motor and the rotary cutter.

3. A lawn mower including, two spaced wheels, a yoke between the wheels and supported thereby for pivotal movement, side plates between the wheels, means pivotally connecting the forward parts of the plates with the yoke, a relatively stationary blade extending between the plates, a rotary cutter carried by the plates to cooperate with said blade, a motor on the yoke, a drive between the motor and the rotary cutter, and cooperating parts carried by the yoke and plates slackly suspending the rear portions of the plates from the yoke.

4. A lawn mower including, two spaced wheels, a yoke between the wheels and supported thereby, side plates between the wheels pivotally carried by the yoke, a relatively stationary blade extending between the plates, a rotary cutter carried by the plates to cooperate with said blade, rods carried by the yoke and cooperating with the plates at points spaced from the pivotal axis of the plates for limiting downward pivoting of the plates relative to the yoke, a motor on the yoke, and a drive between the motor and the rotary cutter.

5. A lawn mower including, two spaced wheels having a common axis of rotation, a yoke between the wheels and supported thereby, side plates between the wheels pivotally carried by the yoke for limited pivotal movement about an axis spaced forwardly of the common axis of the wheels, a relatively stationary blade extending between the plates, a rotary cutter carried by the plates to cooperate with said blade; a motor on the yoke substantially directly above the common axis of the wheels, and a drive between the motor and the rotary cutter.

6. A lawn mower including, two spaced wheels, a yoke between the wheels and supported thereby, side plates between the wheels, means pivotally connecting the forward portions of the plates with the yoke, a relatively stationary blade extending between the plates, suspension members carried by the yoke slackly suspending the rear portions of the plates from the yoke, a rotary cutter carried by the plates to cooperate with said blade, the cutter being substantially directly below the common axis of the wheels, a motor carried by the yoke substantially directly above the common axis of the wheels, and a drive between the motor and the rotary cutter.

7. A lawn mower comprising, two spaced wheels, a yoke arranged with its tines at the inner sides of the wheels and pivotally carried thereby, side plates pivotally connected with the outer portions of the yoke tines, members slackly suspending the plates from the said tines at points rearward of said outer portions of the tines and allowing the plates to pivot upwardly relative to the yoke, a relatively stationary blade carried by the plates, a rotatable cutter carried by the plates to cooperate with said blade, a motor on the yoke, and a drive between the motor and the cutter.

8. A lawn mower comprising, two spaced wheels, a yoke arranged with its tines at the inner sides of the wheels and pivotally carried thereby, side plates pivotally connected with the outer portions of the yoke tines, slack connections between the plates and the said tines limiting downward movement of the plates and allowing the plates to pivot upwardly relative to the yoke, said connections including adjusting means for regulating the normal position of the plates, a relatively stationary blade carried by the plates, a rotatable cutter carried by the plates to cooperate with said blade, a motor on the yoke, and a drive between the motor and the cutter.

9. A lawn mower comprising, two spaced wheels, a yoke arranged with its tines at the inner sides of the wheels and pivotally carried thereby, side plates pivotally connected with the outer portions of the yoke tines, members slackly suspending the rear portions of the plates from the tines and allowing the plates to pivot upwardly relative to the yoke, counter-balancing springs connected between the said tines and the plates, a relatively stationary blade carried by the plates, a rotatable cutter carried by the plates to cooperate with said blade, a motor on the yoke, and a drive between the motor and the cutter.

10. A lawn mower comprising, two spaced wheels, a yoke arranged with its tines at the inner sides of the wheels and pivotally carried thereby, side plates pivotally connected with the outer portions of the yoke tines, slack connections between the plates and the said tines limiting downward movement of the plates and allowing the plates to pivot upwardly relative to the yoke, a relatively stationary blade carried by the plates, a rotatable cutter carried by the plates to cooperate with said blade, a motor on the yoke, and a drive between the motor and the cutter, the drive including a driving element on the motor shaft, a shaft rotatably mounted on a tine to have its axis adjacent the pivotal axis of the adjacent plate, a rotatable element on the shaft, a flexible member operating over said elements, a second rotatable element on said shaft, a driven element on the cutter, and a flexible member operating over the said second element and the driven element.

11. A lawn mower comprising, two spaced wheels, a yoke arranged with its tines at the inner sides of the wheels and pivotally carried thereby, side plates pivotally connected with the outer portions of the yoke tines, slack connections between the plates and the said tines limiting downward movement of the plates and allowing the plates to pivot upwardly relative to the yoke, a relatively stationary blade carried by the plates, a rotatable cutter carried by the plates to cooperate with said blade, a motor on the yoke, and a drive between the motor and the cutter, the drive including, a bearing on a tine, a shaft carried by the bearing to have its axis adjacent the pivotal axis of the adjacent plate, a drive between the motor and said shaft, an element fixed to said shaft, an element fixed to the shaft of the cutter, and a flexible member operating over said elements.

12. A lawn mower comprising, two spaced wheels, a yoke arranged with its tines at the inner sides of the wheels and pivotally carried thereby, side plates pivotally connected with the outer portions of the yoke tines, slack connections between the plates and the said tines limiting downward movement of the plates and allowing the plates to pivot upwardly relative to the yoke, a relatively stationary blade carried by the plates, a rotatable cutter carried by the plates to cooperate with said blade, a motor on the yoke, and a drive between the motor and the cutter, the drive including a bearing, means adjustably mounting the bearing on a tine, a shaft carried by the bearing to have its axis adjacent the pivotal axis of the adjacent plate, a belt and pulley drive between the motor and said shaft, and a belt and pulley drive between said shaft and the cutter.

13. A lawn mower comprising, two spaced wheels, a yoke arranged with its tines at the inner sides of the wheels and pivotally carried thereby, side plates pivotally connected with the outer portions of the yoke tines, projections on the plates, suspension members depending from the said tines and cooperating with the under sides of the projections to limit downward movement of the plates and otherwise free of the plates to allow the plates to pivot upwardly relative to the yoke, a relatively stationary blade carried by the plates, a rotatable cutter carried by the plates to cooperate with said blade, a support member extending between and connected to the tines of the yoke, a motor on said member, and a drive between the motor and the cutter.

14. A lawn mower comprising, two spaced wheels, a yoke arranged with its tines at the inner sides of the wheels and pivotally carried thereby, side plates pivotally connected with the outer portions of the yoke tines, slack connections between the plates and the said tines limiting downward movement of the plates and allowing the plates to pivot upwardly relative to the yoke, a relatively stationary blade carried by the plates, a rotatable cutter carried by the plates to cooperate with said blade, a motor on the yoke, and a drive between the motor and the cutter, said drive including a bearing on one of said plates, a shaft carried by the bearing to have its axis adjacent the pivotal axis of said plate, a drive between the motor and said shaft, and a drive between said shaft and the cutter.

15. A lawn mower comprising, two spaced wheels, a yoke arranged with its tines at the inner sides of the wheels and pivotally carried thereby, side plates pivotally connected with the outer portions of the yoke tines, slack connections between the plates and the said tines limiting downward movement of the plates and allowing the plates to pivot upwardly relative to the yoke, a relatively stationary blade carried by the plates, a rotatable cutter carried by the plates to cooperate with said blade, a motor on the yoke, and a drive between the motor and the cutter, said drive including a bearing, means adjustably securing the bearing to one of said plates, a belt and pulley drive between the motor and said shaft, and a belt and pulley drive between the said shaft and the cutter.

JOSEPH C. STAUFFER.